US012124622B2

(12) United States Patent
Zuber et al.

(10) Patent No.: US 12,124,622 B2
(45) Date of Patent: Oct. 22, 2024

(54) RANGE FINDING AND ACCESSORY TRACKING FOR HEAD-MOUNTED DISPLAY SYSTEMS

(71) Applicant: Apple Inc., Cupertino, CA (US)

(72) Inventors: Wesley W. Zuber, Mountain View, CA (US); Thayne M. Miller, San Jose, CA (US); Jae Hwang Lee, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 269 days.

(21) Appl. No.: 16/141,492

(22) Filed: Sep. 25, 2018

(65) Prior Publication Data

US 2019/0094955 A1 Mar. 28, 2019

Related U.S. Application Data

(60) Provisional application No. 62/564,171, filed on Sep. 27, 2017.

(51) Int. Cl.
*G06F 3/01* (2006.01)
*G01S 7/481* (2006.01)
(Continued)

(52) U.S. Cl.
CPC ............ *G06F 3/011* (2013.01); *G01S 7/4813* (2013.01); *G01S 15/08* (2013.01); *G01S 15/42* (2013.01);
(Continued)

(58) Field of Classification Search
CPC ....................................................... G06F 3/011
See application file for complete search history.

(56) References Cited

U.S. PATENT DOCUMENTS 8,363,144 B2   1/2013 Vice
8,577,538 B2   11/2013 Lenser et al.
(Continued)

FOREIGN PATENT DOCUMENTS

CN   204316708   5/2015
WO   2017021902 A1   2/2017

OTHER PUBLICATIONS

International Search Report and Written Opinion from PCT/US2018/053001, Dated Dec. 7, 2018, Apple Inc., pp. 1-13.
(Continued)

*Primary Examiner* — William Boddie
*Assistant Examiner* — Andrew B Schnirel
(74) *Attorney, Agent, or Firm* — Alexander A. Knapp; Kowert, Hood, Munyon, Rankin & Goetzel, P.C

(57) ABSTRACT

Range finding methods and apparatus that may be implemented by VR/MR systems that include a head-mounted display (HMD) and an accessory that the user holds or wears. Range finding sensors (e.g., ultrasonic transducers) may be included on the HMD and on the accessory and used to track distances to and relative position of walls, objects, and other obstacles within constrained physical environments such as rooms, gyms, yards, or fields, or in unconstrained physical environments. Range finding information from the sensors on the HMD and accessory can be used to generate a 3D map of the user's environment that can be used for various purposes in the VR/MR system. In addition to mapping the user's environment, the range finding methods and apparatus may also be used to track the relative position of the accessory with respect to the HMD.

21 Claims, 9 Drawing Sheets

(51) Int. Cl.
  *G01S 15/08*     (2006.01)
  *G01S 15/42*     (2006.01)
  *G01S 15/66*     (2006.01)
  *G01S 15/86*     (2020.01)
  *G01S 15/87*     (2006.01)
  *G01S 15/88*     (2006.01)
  *G01S 15/89*     (2006.01)
  *G06F 3/0346*    (2013.01)
  *G06F 3/04815*   (2022.01)
  *G06T 17/00*     (2006.01)
  *G01S 17/89*     (2020.01)

(52) U.S. Cl.
  CPC ............. *G01S 15/66* (2013.01); *G01S 15/86* (2020.01); *G01S 15/87* (2013.01); *G01S 15/88* (2013.01); *G01S 15/89* (2013.01); *G06F 3/016* (2013.01); *G06F 3/0346* (2013.01); *G06F 3/04815* (2013.01); *G06T 17/00* (2013.01); *G01S 17/89* (2013.01)

(56) References Cited

U.S. PATENT DOCUMENTS

| | | | |
|---|---|---|---|
| 9,332,285 B1* | 5/2016 | Grant | H04N 21/47205 |
| 9,366,862 B2 | 6/2016 | Haddick et al. | |
| 9,754,167 B1 | 9/2017 | Holz et al. | |
| 2009/0086015 A1 | 4/2009 | Larsen et al. | |
| 2013/0293586 A1 | 11/2013 | Kaino et al. | |
| 2013/0335301 A1* | 12/2013 | Wong | G06F 3/04815 |
| | | | 345/8 |
| 2015/0094142 A1 | 4/2015 | Stafford | |
| 2016/0124502 A1 | 5/2016 | Sawyer et al. | |
| 2016/0148433 A1* | 5/2016 | Petrovskaya | G06T 19/006 |
| | | | 345/633 |
| 2016/0187651 A1* | 6/2016 | Border | B60Q 9/008 |
| | | | 345/8 |
| 2016/0227262 A1* | 8/2016 | Grant | H04N 21/23439 |
| 2016/0350973 A1 | 12/2016 | Hastings | |
| 2017/0061631 A1* | 3/2017 | Karasudani | G06F 3/14 |
| 2017/0151484 A1* | 6/2017 | Reilly | A63B 69/0024 |
| 2017/0192620 A1 | 7/2017 | Kim | |
| 2017/0249822 A1 | 8/2017 | Kotoyori et al. | |
| 2018/0045963 A1* | 2/2018 | Hoover | G02B 27/0172 |
| 2018/0053056 A1* | 2/2018 | Rabinovich | G06N 3/0445 |

OTHER PUBLICATIONS

Office action from Chinese Application No. 201880061052.6, dated Sep. 23, 2021, (Chinese version only), pp. 1-11.

Office Action mailed Dec. 13, 2022 in Chinese Patent Application No. 201880061052.6, Apple Inc.

* cited by examiner

RANGE FINDING AND ACCESSORY TRACKING FOR HEAD-MOUNTED DISPLAY SYSTEMS

This application claims benefit of priority to U.S. Provisional Application Ser. No. 62/564,171, entitled "RANGE FINDING AND ACCESSORY TRACKING FOR HEAD-MOUNTED DISPLAY SYSTEMS," filed Sep. 27, 2017, and which is incorporated herein by reference in its entirety.

BACKGROUND

Head-mounted displays (HMDs), for example helmets, goggles, or glasses, may be used in a variety of applications including but not limited to virtual reality (VR) and mixed reality (MR) systems. Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world, or alternatively combines virtual representations of real world objects with views of a three-dimensional (3D) virtual world. The simulated environments of virtual reality and/or the mixed environments of mixed reality may thus be utilized to provide an interactive user experience for multiple applications, such as applications that add virtual content to a real-time view of the viewer's environment, applications that generate 3D virtual worlds, interacting with virtual training environments, gaming, remotely controlling drones or other mechanical systems, viewing digital media content, interacting with the Internet, exploring virtual landscapes or environments, or the like.

SUMMARY

Various embodiments of methods and apparatus for range finding in virtual reality (VR) and mixed reality (MR) systems are described. Embodiments of range finding methods and apparatus are described that may, for example, be implemented by VR/MR systems that include a head-mounted display (HMD) such as a helmet, goggles, or glasses, and an accessory that the user is holding or wearing (e.g., a hand-held device such as a controller for the HMD or a mobile multipurpose device). In embodiments, range finding sensors (e.g., transmitters and receivers (or transceivers), for example ultrasonic transducers), may be included on the HMD and on the accessory and used to track distances to and relative position of walls, objects, and other obstacles within constrained physical environments such as rooms, gyms, yards, or fields, or in unconstrained physical environments. Range finding information from the sensors on the HMD and accessory can be used to generate a 3D map of the user's environment that can be used for various purposes in the VR/MR system. In addition to mapping the user's environment, embodiments of the range finding methods and apparatus may also be used to track the relative position of the accessory with respect to the HMD.

To track distances to and relative position of walls, objects, and other obstacles within physical environments, the ultrasonic transducers on the HMD and/or the ultrasonic transducers on the accessory send ultrasonic signals or "pings" that reflect or echo off surfaces in the environment; the echoes are received by some number of ultrasonic transducers on the HMD and/or on the accessory. Time delays for the echoes can be measured and analyzed to estimate the distances and relative positions of the surfaces. Including range finding sensors such as ultrasonic transducers on the accessory allows more of the environment to be scanned than can be scanned by the range finding sensors on the HMD.

The position of the accessory with respect to the HMD can be tracked using the ultrasonic transducers, or a combination of the ultrasonic transducers with motion and orientation information obtained from an inertial-measurement unit (IMU) in the accessory and/or in the HMD. In some embodiments, to track the accessory, the ultrasonic transducers on the HMD (e.g., three transducers) send ultrasonic signals or "pings" that are received by some number of ultrasonic transducers on the accessory. Alternatively, the ultrasonic transducers on the accessory (e.g., three transducers) send ultrasonic signals that are received by some number of ultrasonic transducers on the HMD. Time of flight for the signals from the transmitters to the receivers may be analyzed to determine distance, relative position, and orientation of the accessory with respect to the HMD.

Figure 1:
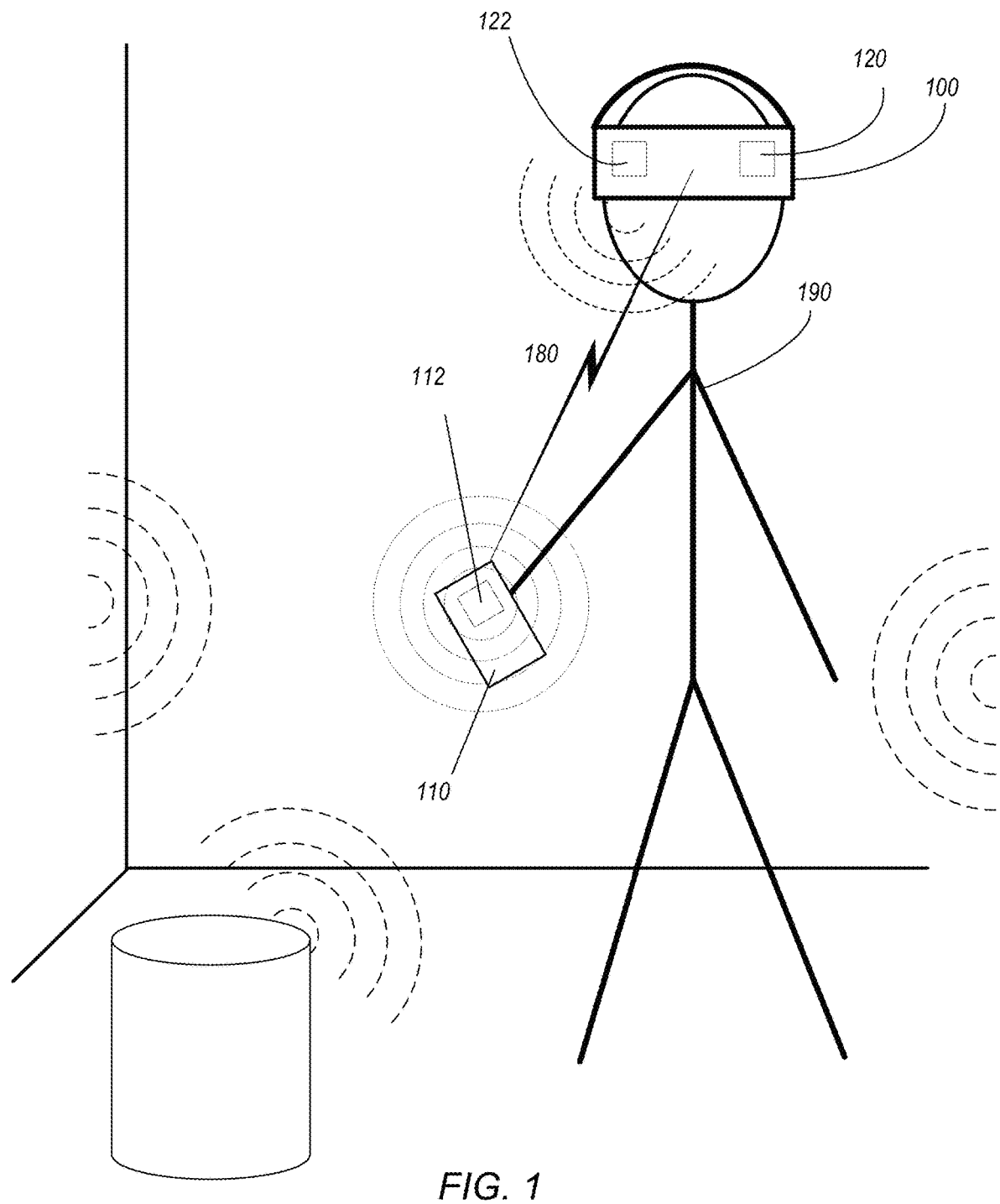
FIG. 1 illustrates an example virtual reality (VR) or mixed reality (MR) system that includes a head-mounted display (HMD) and accessory that include ultrasonic sensors for mapping the user's environment, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for range finding in virtual reality (VR) and mixed reality (MR) systems are described. Embodiments of range finding methods and apparatus are described that may be implemented by VR/MR systems that include a head-mounted display (HMD) such as a helmet, goggles, or glasses, and an accessory that the user is holding or wearing (e.g., a hand-held device such as a controller or wand, a wristband or watch, a mobile multipurpose device such as a smartphone, pad or tablet, a glove or gauntlet, etc.). In some embodiments, the HMD and accessory may communicate and exchange data (e.g., data collected by the range finding sensors) via a wireless connection. Alternatively, the HMD and accessory may be connected via a wired connection.

Embodiments of methods and apparatus for range finding as described herein may, for example, be implemented in VR/MR systems that allow the user freedom of movement within a physical environment. A VR/MR system may include an HMD. In some embodiments, the HMD may be a stand-alone device. However, in some embodiments, the VR/MR system may also include a separate computing device, referred to herein as a base station, which implements at least some of the functionalities of the VR/MR system, and which communicates with the HMD over a wired or wireless connection.

The HMD may include sensors (e.g., video cameras, ambient light sensors, etc.) that collect information about the user's environment, and may also include sensors that collect information about the user (e.g., the user's expressions, eye movement, head movement, hand gestures, etc.). In VR/MR systems that include a base station, the information collected by the sensors may be transmitted to the base station via a wired or wireless connection. The base station and/or HMD may include software and hardware (e.g., processors (system on a chip (SOC), CPUs, image signal processors (ISPs), graphics processing units (GPUs), coder/decoders (codecs), etc.), memory, etc.) that generate virtual content and render frames based at least in part on the sensor information received from the sensors on the HMD. In VR systems, the HMD displays the frames to provide views of a virtual world to the user as the user moves about in the real world environment. In MR systems, the HMD displays the frames to provide an augmented view of the real-world environment.

In embodiments, the VR/MR system may include an accessory that a user may hold or wear. Examples of accessories may include, but are not limited to, a hand-held device such as a controller or wand, a wristband or watch, a mobile multipurpose device such as a smartphone, pad or tablet, a glove or gauntlet, etc. In some embodiments, the accessory may communication with the HMD via a wired or wireless connection. In some embodiments, the accessory may instead or also communicate with a base station via a wired or wireless connection.

In embodiments, range finding sensors (e.g., transmitters and receivers (or transceivers), for example ultrasonic transducers), may be included on the HMD and on the accessory. The range finding sensors may, for example, be used to track distances to and relative position of walls, objects, and other obstacles within constrained physical environments such as rooms, gyms, yards, or fields, or in unconstrained physical environments. Range finding data from the sensors on the HMD and accessory may, for example, be used to generate a 3D map of the user's environment that can be used for various purposes in the VR/MR system. In addition to mapping the user's environment, embodiments of the range finding methods and apparatus may also be used to track the relative position of the accessory with respect to the HMD.

While various types of range finding sensors may be used in embodiments, including but not limited to light-based sensors such as Light Detection and Ranging (LIDAR) technology sensors, embodiments are generally described that use ultrasonic transducers (e.g., ultrasonic transmitters and ultrasonic receivers, or ultrasonic transceivers) that use sound for range finding. An advantage of using sound over light is that light-based sensors may have difficulty with some surfaces such as glass and mirrors that ultrasonic transducers can easily detect. In addition, light-based sensors may have problems with light interference in some conditions such as bright sunlight. In some embodiments, a VR/MR system may include both light-based sensors and ultrasonic transceivers, and the range finding data from the two systems may be combined to more accurately map the user's environment.

To track distances to and relative position of walls, objects, and other obstacles within physical environments, the ultrasonic transducers on the HMD and/or the ultrasonic transducers on the accessory send ultrasonic signals or "pings" that reflect or echo off surfaces and objects in the environment; the echoes are received by some number of ultrasonic transducers on the HMD and/or on the accessory. Time delays for the echoes can be measured and analyzed to estimate the distances and relative positions of the surfaces and objects.

Including range finding sensors such as ultrasonic transducers on the accessory allows more of the environment to be scanned than can be scanned by the range finding sensors on the HMD. The user holds the accessory in their hand or wears it on their arm, and thus the accessory may scan portions of the environment that are not within the range of forward-facing sensors of the HMD, for example to the side or rear of the user. Also, the user may move their arm about while holding to the accessory to map portions of the room that are not within the range of the sensors on the HMD. In addition, the range finding sensors on the accessory be used to detect potential collisions of the user's hand or arm with surfaces and objects in the environment when the user is moving their arm; the user may be alerted to prevent the collision, for example using audio, visual, and/or haptic feedback.

In some embodiments, the position and orientation of the accessory with respect to the HMD can be tracked using the ultrasonic transducers, or a combination of the ultrasonic transducers with motion and orientation information obtained from an inertial-measurement unit (IMU) in the accessory and/or in the HMD. In some embodiments, to track motion and orientation of the accessory using the ultrasonic transducers, the ultrasonic transducers on the HMD (e.g., three transducers) send ultrasonic signals or "pings" that are received by some number of ultrasonic transducers on the accessory. Alternatively, the ultrasonic transducers on the accessory (e.g., three transducers) send ultrasonic signals that are received by some number of ultrasonic transducers on the HMD. Time of flight for the signals from the transmitters to the receivers may be analyzed to determine distance, relative position, and orientation of the accessory with respect to the HMD.

The fidelity of motion detection using ultrasonics is limited by the speed of sound, and thus the ultrasonic transducers may be better suited to tracking normal or slower motions, but not well suited to tracking rapid motions or rotations. Thus, in some embodiments, an IMU may be included in the accessory and used to track rapid motions and rotations of the accessory. Motion and orientation data collected by the IMU may be used in conjunction with motion and orientation data collected by the ultrasonic transducers in tracking the position of the accessory with respect to the HMD.

In some embodiments, motion and orientation data collected by the ultrasonic transducers may be used to correct drift of the IMU in the accessory. The IMU detects acceleration and rotation of the accessory, but cannot itself detect the absolute position in 3D space of the accessory. Accumulated errors in measurement may result in drift, which may, for example, cause the IMU to sense acceleration or rotation when there is none. The motion and orientation data collected by the ultrasonic transducers on the HMD and accessory, however, may be used to calculate the position, orientation, and motion of the accessory. Position, orientation, and motion as determined from the motion and orientation data collected by the ultrasonic transducers may be compared to position, orientation, and motion that the IMU is reporting. If a discrepancy is detected, for example if the IMU reports motion or rotation when the ultrasonic system detects no motion or rotation, this indicates that the IMU is experiencing drift, and the IMU may be re-initialized to correct the drift.

The ultrasonic transducers on the HMD and accessory may, for example, be used to detect stationary or moving objects (e.g., furniture, people, etc.) and surfaces (e.g., walls, mirrors, glass) in the real world environment as the user is moving about in the environment. In some embodiments, in a VR system, the system may perform a hard reset of the user's position or orientation if the user is in danger of a collision with a detected object or surface. In some embodiments, in a VR or MR system, the system may provide audio, visual, and/or haptic feedback or alerts to the user if the system detects a potential collision with an object or surface. In some embodiments, virtual representations or indications of real-world objects or surfaces detected by the ultrasonic transducers may be displayed to the user in the VR or MR view as they move about.

While embodiments of VR/MR systems are generally described that include ultrasonic transducers on an HMD and on an accessory that the user holds in their hand or wears on their arm, VR/MR systems may also be implemented in which ultrasonic transducers are included on the accessory but not on the HMD. In addition, an HMD with ultrasonic transducers as described herein may be used without an accessory. Further, in some embodiments, ultrasonic transducers may be included elsewhere in the environment or on the user. For example, in a constrained environment such as a room, ultrasonic transmitters may be mounted at different locations on the walls or on objects within the environment; ultrasonic transducers on the HMD and/or accessory may receive signals or pings from the ultrasonic transmitters. Time of flight and directionality of the pings may be used in mapping the environment. As another example, ultrasonic transmitters may be included at different locations on the user. For example, in some embodiments, a user may hold accessories in both hands, or wear accessories on both arms, that both include ultrasonic transducers. As another example, ultrasonic transducers may be attached to the user's clothing at different locations on the user's body, for example on the back or on the legs. As another example, the base station may include range finding sensors such as ultrasonic transducers, and range finding data collected by the sensors on the base station may be used in conjunction with range finding data collected by other sensors in the system (e.g., the sensors on the HMD and/or accessory) in mapping the environment.

While the methods and apparatus for range finding using ultrasonic transducers are primarily described herein in relation to VR/MR systems that include an HMD (e.g., a helmet, goggles, or glasses) to display virtual content in virtual or augmented views and a hand-held device such as a controller, note that the methods and apparatus for range finding using ultrasonic transducers may also be applied in other types of personal display systems that use HMDs to display video frames and that may also include a hand-held device.

Figure 2:
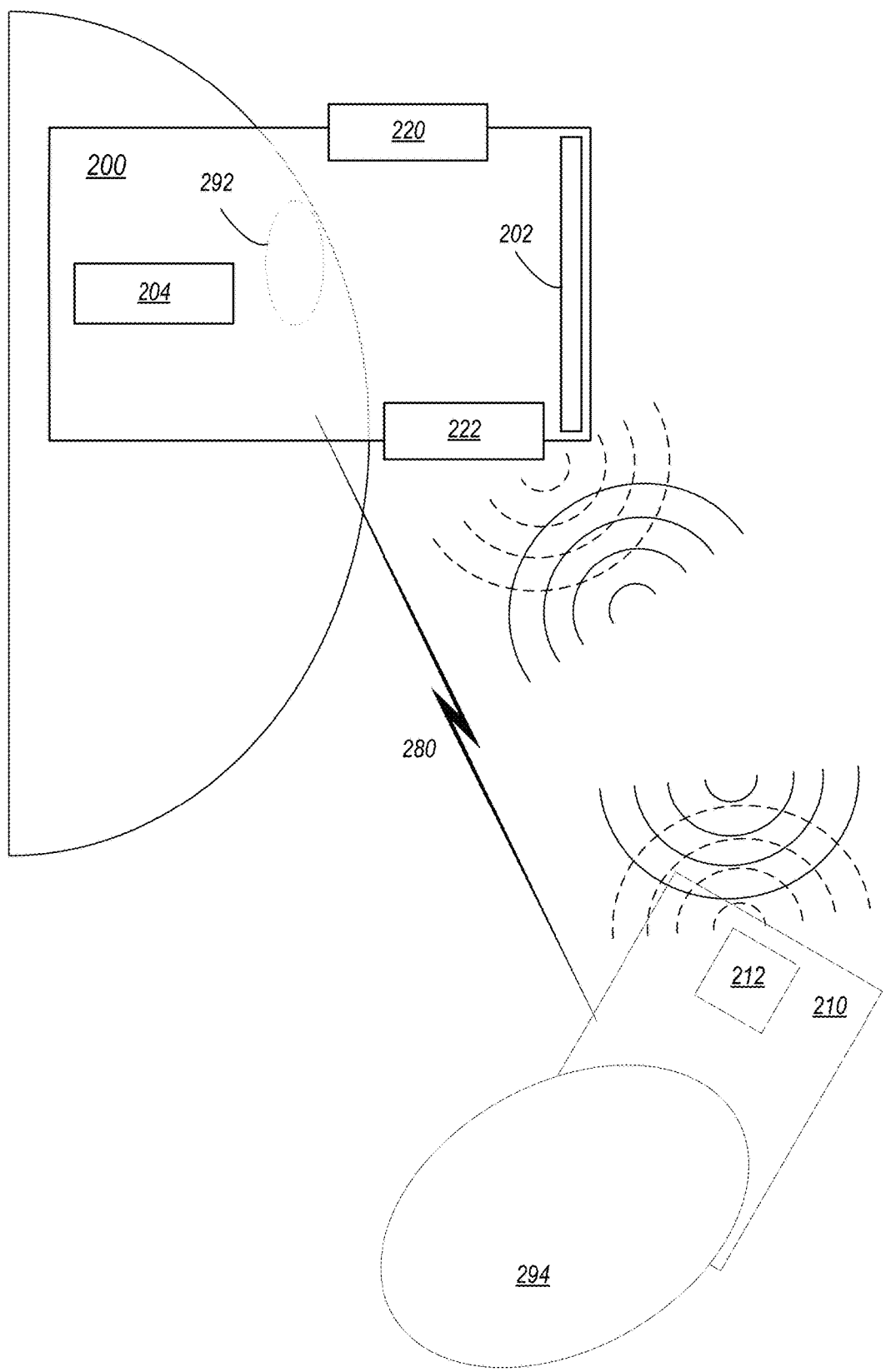
FIG. 2 illustrates an example VR/MR system that includes ultrasonic sensors on the HMD and accessory that are used to track relative position of the accessory to the HMD, according to some embodiments.
Figure 3:
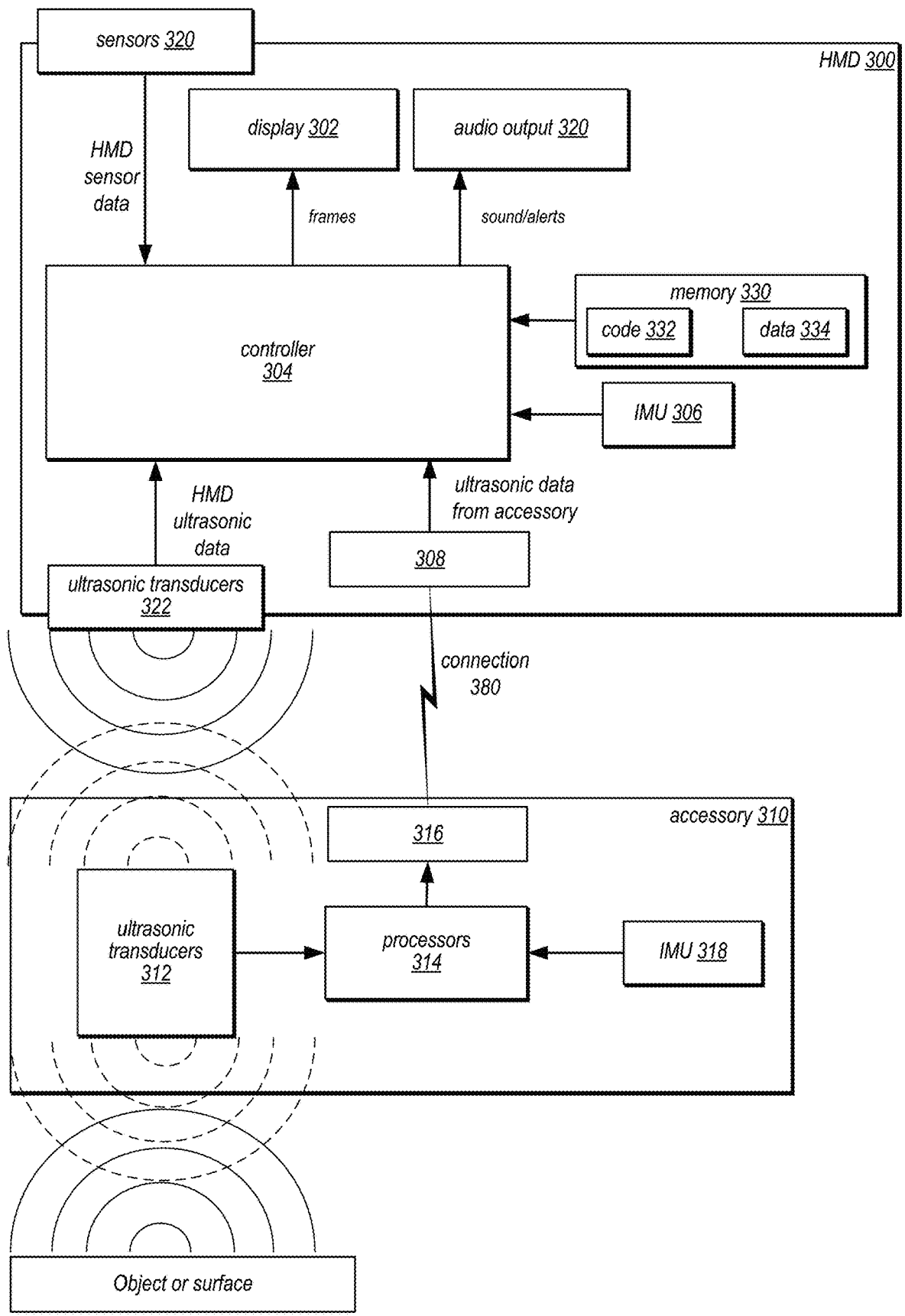
FIG. 3 is a block diagram illustrating components of an example VR/MR system as illustrated in FIGS. 1 and 2, according to some embodiments.

FIGS. 1 through 3 illustrate embodiments of an example virtual reality (VR) or mixed reality (MR) system that may implement embodiments of the range finding methods and apparatus as described herein.

FIG. 1 illustrates an example virtual reality (VR) or mixed reality (MR) system that includes a head-mounted display (HMD) and hand-held device that include ultrasonic sensors for mapping the user's environment, according to some embodiments. In some embodiments, a VR/MR system may include an HMD 100 such as a headset, helmet, goggles, or glasses that may be worn by a user 190. In some embodiments, the HMD 100 may be a stand-alone system. However, in some embodiments, the VR/MR system may include a base station (not shown) configured to render frames for display by the HMD 100. In some embodiments, the HMD 100 and base station may each include wireless communications technology that allows the HMD 100 and base station to communicate and exchange data. However, in some embodiments, a wired connection between the HMD 100 and base station 160 may be used. The base station may be located separately from the user 190, or alternatively may be a portable device that can be carried by the user 190, for example in a backpack.

In some embodiments, a VR/MR system may also include an accessory 110 (e.g., a hand-held device such as a controller or wand, a wristband or watch, a mobile multipurpose device such as a smartphone, pad or tablet, a glove or gauntlet, etc.) that the user may wear or carry. For example, the VR/MR system may include an accessory 110 that may be held by the user 190 that allows the user to interact with virtual content in the VR or AR view, or to otherwise control or interact with the VR or AR experience. The accessory 110 may communicate with the HMD 100 via a wired or wireless connection 180. In embodiments that include a base station, the accessory 110 may instead or also communicate with the base station via a wired or wireless connection.

The HMD 100 may include sensors 120 (e.g., video cameras, infrared or near-infrared cameras, light sensors, etc.) that collect information about the user 190's environment (video, lighting information, etc.), and that may also collect information about the user 190 (e.g., the user's expressions, eye movement, gaze direction, hand gestures, etc.).

The HMD 100 may include ultrasonic transducers 122. In addition, the accessory 110 may include ultrasonic transducers 112. The ultrasonic transducers on the HMD 100 and accessory 110 may, for example, be used to track distances to and relative position of walls, objects, and other obstacles within constrained physical environments such as rooms, gyms, yards, or fields, or in unconstrained physical environments. Range finding data from the ultrasonic transducers on the HMD 100 and accessory 110 may, for example, be used to generate a 3D map of the user's environment that can be used for various purposes in the VR/MR system. In addition to mapping the user's environment, the ultrasonic transducers on the HMD 100 and accessory 110 may also be used to track the relative position and orientation of the accessory 110 with respect to the HMD 100.

While embodiments are generally described that include ultrasonic transducers (e.g., ultrasonic transmitters and ultrasonic receivers, or ultrasonic transceivers) that use sound for range finding, in some embodiments other types of range finding sensors may be used, including but not limited to light-based sensors such as Light Detection and Ranging (LIDAR) technology sensors. An advantage of using sound over light is that light-based sensors may have difficulty with some surfaces such as glass and mirrors that ultrasonic transducers can easily detect. In addition, light-based sensors may have problems with light interference in some conditions such as bright sunlight. In some embodiments, a VR/MR system may include both light-based sensors and ultrasonic transducers, and the range finding data from the two systems may be combined to more accurately map the user's environment.

To track distances to and relative position of walls, objects, and other obstacles within the physical environment, the ultrasonic transducers 122 on the HMD 100 and/or the ultrasonic transducers 112 on the accessory 110 send ultrasonic signals or "pings" that reflect or echo off surfaces and objects in the environment; the echoes are received by some number of ultrasonic transducers on the HMD 100 and/or on the accessory 110. Time delays for the echoes can be measured and analyzed to estimate the distances and relative positions of the surfaces and objects.

Including ultrasonic transducers 112 on the accessory 110 allows more of the environment to be scanned than can be scanned by the ultrasonic transducers 122 on the HMD 100. The user 190 holds the accessory 110 in their hand or wears it on their arm, and thus the accessory 110 may scan portions of the environment that are not within the range of forward-facing sensors of the HMD 100, for example to the side or rear of the user 190. Also, the user 190 may move their arm about while holding to the accessory 110 to map portions of the room that are not within the range of the sensors on the HMD 100. In addition, the ultrasonic transducers 112 on the accessory 110 may detect potential collisions of the user's hand or arm with surfaces and objects in the environment when the user 190 is moving their arm; the user may be alerted to prevent the collision, for example using audio, visual, and/or haptic feedback in the HMD 100 and/or accessory 110.

In VR/MR systems that include a base station, the information collected by the sensors 120 and ultrasonic transducers 122 and 112 may be transmitted to the base station via a wired or wireless connection. The base station and/or HMD 100 may render frames including virtual content based at least in part on the various information obtained from the sensors 120 and ultrasonic transducers 122 and 112. In VR systems, the frames may be displayed by the HMD 100 to provide views of a virtual world to the user as the user moves about in the real world environment. In some embodiments, virtual representations of real-world objects detected by the ultrasonic transducers 122 and 112 may be overlaid on or composited in the virtual view provided by the HMD 100. In MR systems, the frames may be displayed by the HMD 100 to provide to provide an augmented view of the real-world environment. In some embodiments, virtual representations or visual enhancements of real-world objects detected by the ultrasonic transducers 122 and 112 may be included in the augmented view provided by the HMD 100.

HMD 100 may implement any of various types of display technologies. For example, HMD 100 may include a near-eye display system that displays left and right images on screens in front of the user 190's eyes that are viewed by a subject, such as DLP (digital light processing), LCD (liquid crystal display) and LCoS (liquid crystal on silicon) technology VR display systems. As another example, HMD 100 may include a direct retinal projector system that scans left and right images, pixel by pixel, to the subject's eyes. To scan the images, left and right projectors generate beams that are directed to left and right display screens (e.g., ellipsoid mirrors) located in front of the user 190's eyes; the display screens reflect the beams to the user's eyes. To create a three-dimensional (3D) effect, virtual content at different depths or distances are shifted left or right in the two images as a function of the triangulation of distance, with nearer objects shifted more than more distant objects.

While not shown in FIG. 1, in some embodiments the VR/MR system may include one or more other components. While FIG. 1 shows a single user 190 wearing an HMD 100 and carrying an accessory 110, in some embodiments the VR/MR system may support multiple users 190 wearing HMDs 100 that may communicate with each other via wireless connections, or that alternatively may communicate with a base station to thus enable multiple users 190 to use the VR/MR system at the same time in a co-located physical environment. In some embodiments, ultrasonic transducers on a first user's HMD 100 and/or accessory 110 may receive signals from ultrasonic transducers on a second user's HMD 100 and/or accessory 110; the VR/MR system may, for example, use the data collected from the ultrasonic transducers to identify the location of the second person in the environment.

FIG. 2 illustrates an example VR/MR system that includes ultrasonic sensors on the HMD and accessory that are used to track relative position of the accessory to the HMD, according to some embodiments. FIG. 2 shows a side view of an example HMD 200 that includes world and users sensors 220 and ultrasonic sensors 222 used with an accessory 210 that includes ultrasonic sensors 212, according to some embodiments. Note that HMD 200 and accessory 210 as illustrated in FIG. 2 are given by way of example, and are not intended to be limiting. In various embodiments, the shape, size, and other features of an HMD and accessory may differ, and the locations, numbers, types, and other features of the sensors may vary.

As shown in FIG. 2, HMD 200 may be worn on a user 290's head so that the display 202 (e.g. screens and optics of a near-eye VR display system, or reflective components (e.g., ellipsoid mirrors) of a direct retinal projector system) are disposed in front of the user 290's eyes 292. In some embodiments, HMD 200 may include sensors 220 (e.g., video cameras, infrared or near-infrared cameras, light sensors, etc.) that collect information about the user 290's environment (video, lighting information, etc.), and that may also collect information about the user 290 (e.g., the user's expressions, eye movement, gaze direction, hand gestures, etc.). HMD 200 may include ultrasonic transducers 222 (e.g., ultrasonic transmitters and ultrasonic receivers, or ultrasonic transceivers). HMD 200 may include one or more of various types of processors 204 (system on a chip (SOC), CPUs, image signal processors (ISPs), graphics processing units (GPUs), coder/decoders (codecs), etc.).

Figure 4:
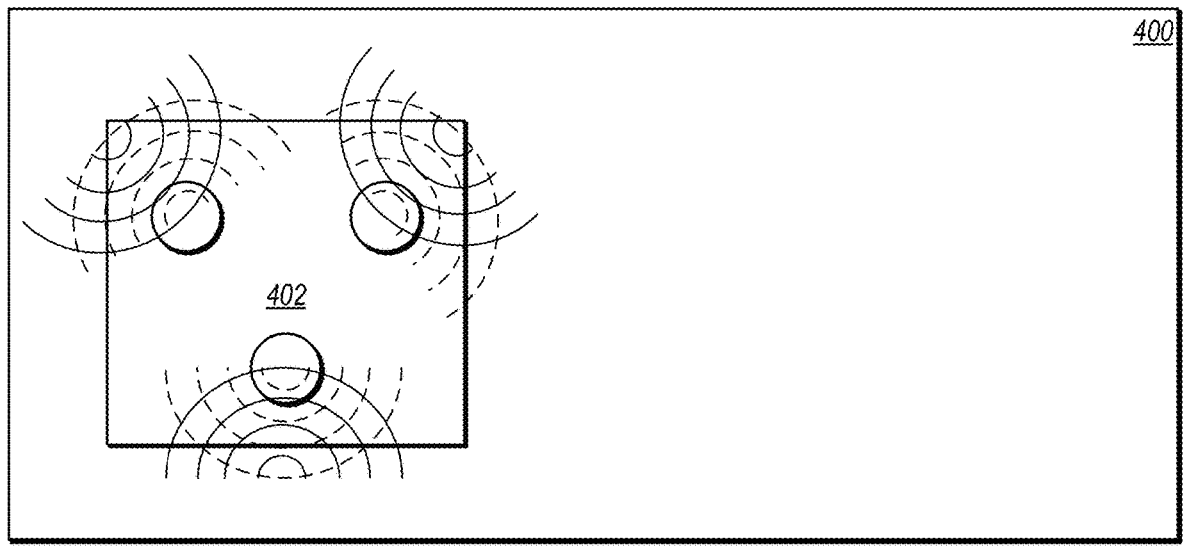
FIG. 4 illustrates ultrasonic transducers on an example device, according to some embodiments.

In some embodiments, there may be one or more ultrasonic transducers 222 located on a front surface of the HMD 200. However, in various embodiments, ultrasonic transducers 222 may instead or also be positioned at other locations on the HMD 200, for example on the sides, top, or bottom of the HMD 200. In some embodiments, an array of three ultrasonic transducers 222 may be used; however, more or fewer ultrasonic transducers 222 may be used in some embodiments. In some embodiments, ultrasonic transducers 222 may be transceivers. However, in some embodiments, ultrasonic transducers 222 may include one or more transmitters and one or more receivers. FIG. 4 further illustrates ultrasonic transducers 222 on a device such as an HMD 200.

Accessory 210 may be a hand-held device such as a controller or wand, a wristband or watch, a mobile multi-purpose device such as a smartphone, pad or tablet, a glove or gauntlet, etc. that the user 290 may wear or carry in their hand 294. Accessory 210 may include ultrasonic transducers 212 (e.g., ultrasonic transmitters and ultrasonic receivers, or ultrasonic transceivers). Accessory may communicate with the HMD 200 via a wired or wireless connection 280.

In some embodiments there may be one or more ultrasonic transducers 212 located on at least one surface of the accessory 210. In some embodiments, an array of three ultrasonic transducers 212 may be used; however, more or fewer ultrasonic transducers 212 may be used in some embodiments. In some embodiments, ultrasonic transducers 212 may be transceivers. However, in some embodiments, ultrasonic transducers 212 may include one or more transmitters and one or more receivers. FIG. 4 further illustrates ultrasonic transducers 212 on a device such as an accessory 210.

In some embodiments, the position and orientation of the accessory 210 with respect to the HMD 200 can be tracked using the ultrasonic transducers, or a combination of the ultrasonic transducers with motion and orientation information obtained from an inertial-measurement unit (IMU) in the accessory 210 and/or in the HMD 200. In some embodiments, to track motion and orientation of the accessory 210 using the ultrasonic transducers, the ultrasonic transducers 222 on the HMD 200 (e.g., three transducers) send ultrasonic signals or "pings" that are received by some number of ultrasonic transducers 212 on the accessory 210. Alternatively, the ultrasonic transducers 212 on the accessory 210 (e.g., three transducers) send ultrasonic signals that are received by some number of ultrasonic transducers 222 on the HMD 200. Time of flight for the signals from the transmitters to the receivers may be analyzed to determine distance, relative position, and orientation of the accessory 210 with respect to the HMD 200. In some embodiments, the ultrasonic transducers on the HMD 200 and on the accessory 210 may emit signals at different rates, frequencies, and/or times so that the transmitters of the signals can be identified at the receivers.

In embodiments where the ultrasonic transducers 222 on the HMD 200 send ultrasonic signals that are received by ultrasonic transducers 212 on the accessory 210, the time of flight for the signals from the transmitters to the receivers may be analyzed on the accessory 212 to determine distance, relative position, and orientation of the accessory 210 with respect to the HMD 200; the computed information may then be transmitted to the HMD 200 via connection 280. In embodiments that include a base station, the computed information may instead or also be transmitted to the base station via a wired or wireless connection. Alternatively, the data collected by the ultrasonic transducers 212 on the accessory 210 may be transmitted to the HMD 200 via connection 280, and the data may be analyzed on the HMD 200 to determine distance, relative position, and orientation of the accessory 210 with respect to the HMD 200.

In embodiments where the ultrasonic transducers 212 on the accessory 210 send ultrasonic signals that are received by ultrasonic transducers 222 on the HMD 200, the time of flight for the signals from the transmitters to the receivers may be analyzed on the HMD 200 to determine distance, relative position, and orientation of the accessory 210 with respect to the HMD 200.

In embodiments that include a base station, data collected by the ultrasonic transducers on the accessory 210 or on the HMD 200 may be transmitted to the base station via a wired or wireless connection, and the data may be analyzed on the base station to determine distance, relative position, and orientation of the accessory 210 with respect to the HMD 200.

The fidelity of motion detection using ultrasonics is limited by the speed of sound, and thus the ultrasonic transducers 212 and 222 may be better suited to tracking normal or slower motions, but not well suited to tracking rapid motions or rotations. Thus, in some embodiments, an IMU may be included in the accessory 210 and used to track rapid motions and rotations of the accessory 210. Motion and orientation data collected by the IMU may be used in conjunction with motion and orientation data collected by the ultrasonic transducers 212 and 222 in tracking the position of the accessory 210 with respect to the HMD 222.

To track distances to and relative position of walls, objects, and other obstacles within the physical environment, the ultrasonic transducers 222 on the HMD 200 and/or the ultrasonic transducers 212 on the accessory 210 send ultrasonic signals or "pings" that reflect or echo off surfaces and objects in the environment; the echoes are received by some number of ultrasonic transducers on the HMD 200 and/or on the accessory 210. Time delays for the echoes can be measured and analyzed, for example by software executing on processors 204, to estimate the distances and relative positions of the surfaces and objects.

Including ultrasonic transducers 212 on the accessory 210 allows more of the environment to be scanned than can be scanned by the ultrasonic transducers 222 on the HMD 200. The user 290 holds the accessory 210 in their hand or wears it on their arm, and thus the accessory 210 may scan portions of the environment that are not within the range of forward-facing sensors of the HMD 200, for example to the side or rear of the user 290. Also, the user 290 may move their hand 294 about while holding to the accessory 210 to map portions of the room that are not within the range of the sensors on the HMD 200. In addition, the ultrasonic transducers 212 on the accessory 210 may detect potential collisions of the user's hand 294 with surfaces and objects in the environment when the user 290 is moving their arm; the user may be alerted to prevent the collision, for example using audio, visual, and/or haptic feedback in the HMD 200 and/or accessory 210.

In embodiments that include a stand-alone HMD 200, the HMD 200 may include a memory configured to store software (e.g., one or more VR or MR applications) that is executable by the processors 204, as well as data that may be used by the software when executing on the HMD 200. The HMD 200 may execute a VR or MR application that is configured to provide a VR or MR experience to the user 290. During execution of the application, the HMD 200 may render frames (each frame including a left and right image) of virtual content for the VR or MR experience. One or more methods may be applied by the VR or MR application during execution based at least in part on the data collected by the sensors 220 and ultrasonic transducers 222 and 212.

In embodiments that include a base station, the HMD 200 may transmit the data collected by the sensors 220 and ultrasonic transducers 222 to the base station of the VR/MR system via a wired or wireless connection for processing. Data collected by the ultrasonic transducers on the accessory 210 may also be transmitted to the base station via a wired or wireless connection. The base station may be an external device (e.g., a computing system, game console, etc.) that is communicatively coupled to HMD 200 via a wired or wireless connection. The base station may include one or more of various types of processors (e.g., SOCs, CPUs, ISPs, GPUs, codecs, and/or other components) and memory configured to store software (e.g., one or more VR or MR applications) that is executable by the processors, as well as data that may be used by the software when executing on the base station. The base station may execute a VR or MR application that is configured to provide a VR or MR experience to the user 290. During execution of the application, the base station may render frames (each frame including a left and right image) of virtual content for the VR or MR experience. One or more methods may be applied by the VR or MR application during execution based at least in part on the data collected by the sensors 220 and ultrasonic transducers 222 and 212. The base station may encode/compress the rendered frames, and transmit the compressed frames to the HMD 200 for processing and display to the left and right displays 202 to thus provide a VR or MR view to the user 290.

In some embodiments, one or more methods may be applied by the VR or MR system based at least in part on the data collected by the ultrasonic transducers 222 and 212 to detect and recognize objects and surfaces in the real world environment, and to determine locations, distances, and velocities of the objects and surfaces with respect to the user 290's current position and motion. In some embodiments, virtual representations of at least some real world objects and surfaces that are detected by the ultrasonic transducers 222 and 212 may be composited into the VR or MR views displayed to the user 290. The virtual representations may correspond to the actual objects (e.g., a physical chair may be shown as a virtual chair, a physical wall may be shown as a virtual wall, etc.) or may represent some other object (e.g., a physical chair may be represented by a virtual bush, a physical wall may be represented by a virtual fence, etc.)

In some embodiments, sensors 220 may include one or more light-based sensors (e.g., infrared (IR) cameras with an IR illumination source, or Light Detection and Ranging (LIDAR) emitters and receivers/detectors) that, for example, capture depth information for objects and surfaces in the user's environment. The depth information collected by the light-based sensors may be used in conjunction with data collected by the ultrasonic transducers 222 and 212 and frames captured by scene cameras to detect and recognize objects and surfaces in the real world environment, and to determine locations, distances, and velocities of the objects and surfaces with respect to the user 290's current position and motion. The depth information collected by the light-based sensors may also be used in conjunction with data collected by the ultrasonic transducers 222 and 212 in positioning virtual representations of real-world objects to be composited into the virtual environment at correct depths. In some embodiments, the depth information collected by the light-based sensors may be used in conjunction with data collected by the ultrasonic transducers 222 and 212 to detect the possibility of collisions with real-world objects and surfaces. In some embodiments there may be one light-based sensor located on a front surface of the HMD 200. However, in various embodiments, more than one light-based sensor may be used, and light-based sensors may be positioned at other locations.

FIG. 3 is a block diagram illustrating components of an example VR/MR system as illustrated in FIGS. 1 and 2, according to some embodiments. In some embodiments, a VR/MR system may include an HMD 300 such as a headset, helmet, goggles, or glasses, and an accessory 310 (e.g., a hand-held device such as a controller or wand, a wristband or watch, a mobile multipurpose device such as a smartphone, pad or tablet, a glove or gauntlet, etc.) that the user may wear or carry. In some embodiments, a VR/MR system may also include a base station (not shown) such as a computing system, game console, etc. that communicates with the HMD 300 and/or the accessory 310 to perform at least some of the functionality of the VR/MR system.

HMD 300 may include a display 302 component or subsystem via which frames containing virtual content may be displayed to the user. Display 302 may implement any of various types of virtual reality display technologies. For example, the HMD 300 may include a near-eye display that displays frames including left and right images on screens that are viewed by a user, such as DLP (digital light processing), LCD (liquid crystal display) and LCoS (liquid crystal on silicon) technology displays. As another example, the HMD 300 may include a direct retinal projector that scans frames including left and right images, pixel by pixel, directly to the user's eyes via a reflective surface (e.g., reflective eyeglass lenses).

HMD 300 may also include a controller 304 comprising one or more processors configured to implement functionality of the HMD 300 in the VR/MR system. In some embodiments, HMD 300 may also include a memory 330 configured to store software (code 332) of the VR/MR system that is executable by the controller 304, as well as data 334 that may be used by the code 332 when executing on the controller 304.

In various embodiments, controller 304 may be a uniprocessor system including one processor, or a multiprocessor system including several processors (e.g., two, four, eight, or another suitable number). Controller 304 may include central processing units (CPUs) configured to implement any suitable instruction set architecture, and may be configured to execute instructions defined in that instruction set architecture. For example, in various embodiments controller 304 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 304 may employ any microarchitecture, including scalar, superscalar, pipelined, superpipelined, out of order, in order, speculative, non-speculative, etc., or combinations thereof. Controller 304 may include circuitry to implement microcoding techniques. Controller 304 may include one or more processing cores each configured to execute instructions. Controller 304 may include one or more levels of caches, which may employ any size and any configuration (set associative, direct mapped, etc.). In some embodiments, controller 304 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 304 may include one or more other components for processing and rendering video and/or images, for example image signal processors (ISPs), coder/decoders (codecs), etc. In some embodiments, controller 304 may include at least one system on a chip (SOC).

Memory 330 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 300 may include at least one inertial-measurement unit (IMU) 306 configured to detect position and/or motion of the HMD 300, and to provide the detected position and/or motion data to the controller 304 of the HMD 300.

In some embodiments, HMD 300 may include sensors 320 (e.g., video cameras, infrared or near-infrared cameras, light sensors, etc.) that collect information about the user's environment (video, lighting information, etc.), and that may also collect information about the user (e.g., the user's expressions, eye movement, gaze direction, hand gestures, etc.).

HMD 300 may include ultrasonic transducers 222 (e.g., ultrasonic transmitters and ultrasonic receivers, or ultrasonic transceivers). In some embodiments there may be one or more ultrasonic transducers 322 located on a front surface of the HMD 300. However, in various embodiments, ultrasonic transducers 322 may be positioned at other locations on the HMD 300, for example on the sides, top, or bottom of the HMD 300. In some embodiments, an array of three ultrasonic transducers 322 may be used; however, more or fewer ultrasonic transducers 322 may be used in some embodiments. In some embodiments, ultrasonic transducers 322 may be transceivers. However, in some embodiments, ultrasonic transducers 322 may include one or more transmitters and one or more receivers. FIG. 4 further illustrates ultrasonic transducers 322 on a device such as an HMD 300.

HMD 300 may also include one or more interfaces 308 configured to communicate with an accessory 310 via a connection 380. In some embodiments, interface 308 may implement a wireless connection 380 between the HMD 300 and accessory 310 using commercial (e.g., Wi-Fi, Bluetooth, etc.) or proprietary wireless communications technology. In some embodiments, interface 308 may implement a wired connection 380 between the HMD 300 and accessory 310 using commercial (e.g., USB, etc.) or proprietary wired communications technology. In embodiments with a base station, interfaces 308 may also be configured to connect to and communicate with the base station using wired or wireless communications technology.

HMD 300 may also include or be connected to an audio output 320 component, for example headphones integrated in the HMD 300 or earbuds connected to the HMD via a wired or wireless connection.

Accessory 310 may be a hand-held device such as a controller or wand, a wristband or watch, a mobile multi-purpose device such as a smartphone, pad or tablet, a glove or gauntlet, etc. that the user may wear or carry in their hand. Accessory 310 may include ultrasonic transducers 312 (e.g., ultrasonic transmitters and ultrasonic receivers, or ultrasonic transceivers). In some embodiments there may be one or more ultrasonic transducers 312 located on at least one surface of the accessory 310. In some embodiments, an array of three ultrasonic transducers 312 may be used; however, more or fewer ultrasonic transducers 312 may be used in some embodiments. In some embodiments, ultrasonic transducers 312 may be transceivers. However, in some embodiments, ultrasonic transducers 312 may include one or more transmitters and one or more receivers. FIG. 4 further illustrates ultrasonic transducers 312 on a device such as an accessory 310.

Accessory 310 may also include one or more interfaces 316 configured to communicate with HMD 300 via a connection 380. In some embodiments, interface 316 may implement a wireless connection 380 between the HMD 300 and accessory 310 using commercial (e.g., Wi-Fi, Bluetooth, etc.) or proprietary wireless communications technology. In some embodiments, interface 316 may implement a wired connection 380 between the HMD 300 and accessory 310 using commercial (e.g., USB, etc.) or proprietary wired communications technology. In embodiments with a base station, interfaces 316 may also be configured to connect to and communicate with the base station using wired or wireless communications technology.

In some embodiments, accessory 310 may include one or more processors 314 configured to implement functionality of the accessory 310 in the VR/MR system. In some embodiments, accessory 310 may also include a memory (not shown) configured to store software that is executable by the one or more processors 314, as well as 334 that may be used by the code when executing on the one or more processors 314.

In some embodiments, accessory 310 may include at least one inertial-measurement unit (IMU) 318 configured to detect motion and rotation of the accessory 310. The fidelity of motion detection using ultrasonics is limited by the speed of sound, and thus the ultrasonic transducers 312 may be better suited to tracking normal or slower motions, but not well suited to tracking rapid motions or rotations of the accessory. Thus, in some embodiments, IMU 318 may be used to track rapid motions and rotations of the accessory 310. Motion and orientation data collected by the IMU 318 may, for example, be used in conjunction with motion and orientation data collected by the ultrasonic transducers 312 in tracking the position of the accessory 310 with respect to the HMD 300.

In some embodiments, motion and orientation data collected by the ultrasonic transducers 312 and/or 322 may be used to correct drift of the IMU 318 in the accessory 310. The IMU 318 detects acceleration and rotation of the accessory 310, but cannot itself detect the absolute position in 3D space of the accessory 310. Accumulated errors in measurement may result in drift, which may, for example, cause the IMU 318 to sense acceleration or rotation when there is none. The motion and orientation data collected by the ultrasonic transducers on the HMD 300 and accessory 310, however, may be used to calculate the position, orientation, and motion of the accessory 310. Position, orientation, and motion as determined from the data collected by the ultrasonic transducers may be compared to position, orientation, and motion that the IMU 318 is reporting. If a discrepancy is detected, for example if the IMU 318 reports motion or rotation when the ultrasonic system detects no motion or rotation, this indicates that the IMU 318 is experiencing drift, and the IMU 318 may be re-initialized to correct the drift.

FIG. 4 illustrates ultrasonic transducers on an example device, according to some embodiments. Device 400 may be an HMD or an accessory as illustrated in FIGS. 1 through 3. Device 400 may include multiple ultrasonic transducers 402 arranged on a surface or surfaces of the device 400. In some embodiments, ultrasonic transducers 402 may be located on a front surface of the device 400. However, in various embodiments, ultrasonic transducers 402 may instead or also be positioned at other locations on the device 400, for example on the sides, top, or bottom of the device 400. As shown in this example, an array of three ultrasonic transducers 402 may be used; however, more or fewer ultrasonic transducers 402 may be used in some embodiments. In some embodiments, ultrasonic transducers 402 may be transceivers. However, in some embodiments, ultrasonic transducers 402 may include one or more ultrasonic transmitters and one or more ultrasonic receivers. In some embodiments, the ultrasonic transducers 402 may emit signals at different rates, frequencies, and/or times so that the signals can be disambiguated when echoes of the signals off surfaces or objects are received at the ultrasonic transducers 402.

Figure 5:
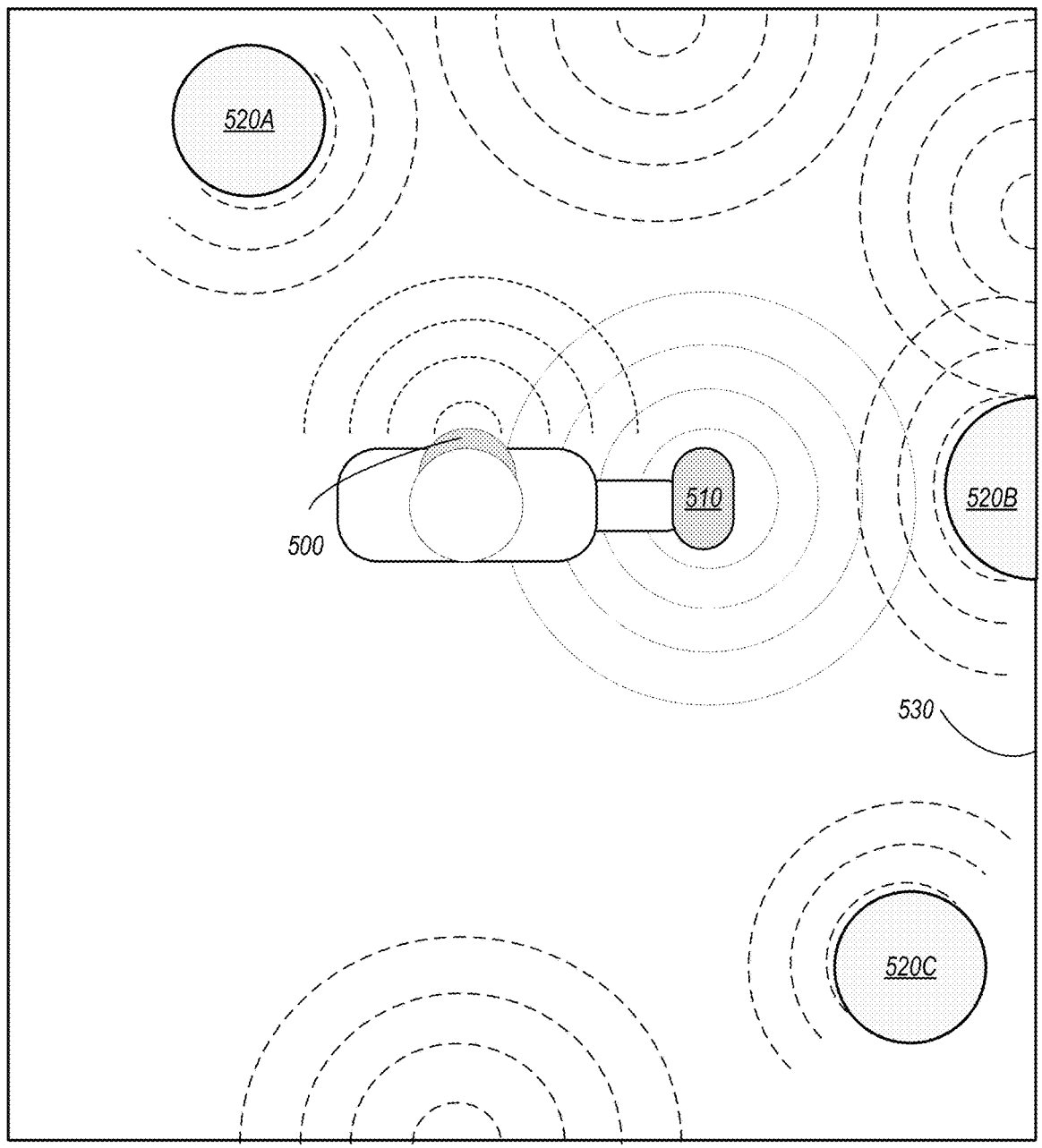
FIGS. 5 and 6 graphically illustrate mapping a real-world environment using ultrasonics in an example VR/MR system as illustrated in FIGS. 1 through 3, according to some embodiments.
Figure 6:
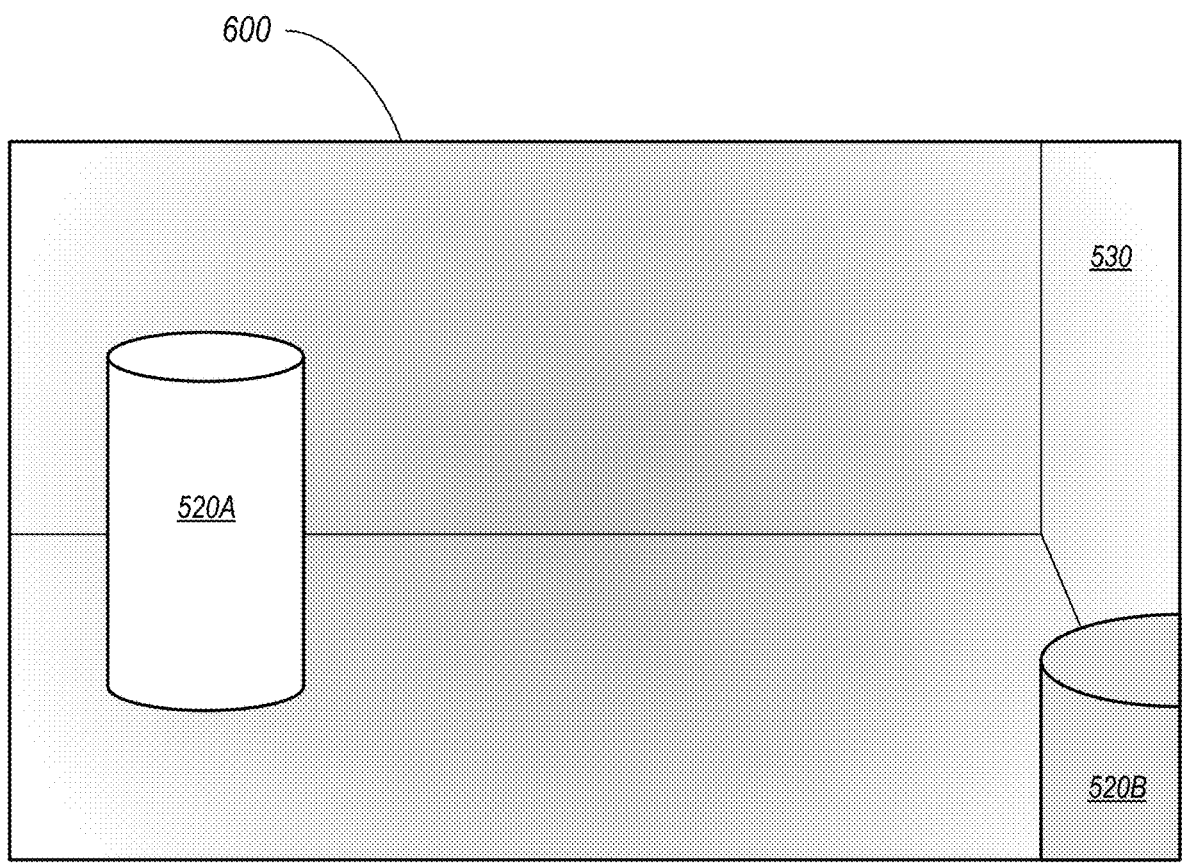

FIGS. 5 and 6 graphically illustrate mapping a real-world environment using ultrasonics in an example VR/MR system as illustrated in FIGS. 1 through 3, according to some embodiments. FIG. 5 shows a user wearing an HMD 500 and carrying an accessory 510 in a real-world environment. The real environment may be a constrained environment such as a room or gym; however, embodiments may also be used in unconstrained environments. The VR/MR system allows the user freedom of movement within the real environment. The real environment may include walls or other surfaces such as glass or mirrors, and may include one or more objects such as furniture or other people. Ultrasonic transducers on the HMD 500 and accessory 510 emit signals or pings that bounce off surfaces and objects within the environment, and receive echoes of the signals off of the surfaces and objects. In some embodiments, the ultrasonic transducers may emit signals at different rates, frequencies, and/or times so that the transmitters of the signals can be identified at the receivers. Time delays for the echoes can be measured and analyzed to estimate the distances and relative positions of the surfaces and objects. The estimated distances and relative positions can be used to construct, augment, or update a 3D map of the environment.

As shown in FIG. 5, the user holds the accessory 510 in their hand or wears it on their arm, and thus the ultrasonic transducers on the accessory 510 may scan portions of the environment that are not within the range of the ultrasonic transducers on the HMD 500, for example to the side or rear of the user. Also, the user may move their arm about while holding the accessory 510 to map portions of the room that are not within the range of the ultrasonic transducers on the HMD 500. In addition, the range finding sensors on the accessory 510 may detect potential collisions of the user's hand or arm with surfaces and objects in the environment when the user is moving their arm; the user may be alerted to prevent a collision, for example using audio, visual, and/or haptic feedback.

As previously indicated, in some embodiments the HMD 500 may be a helmet worn by the user that covers the user's eyes and ears. As such, in some embodiments, the HMD 500 may be relatively bulky and extend beyond the range of the image the user has of their head. In addition, the HMD 500 may cover the user's ears and/or play audio to the user, which takes away the user's sense of hearing that normally provides aural feedback that may help the user to not bump their head against nearby objects or surfaces. Thus, the user may tend to bump the HMD 500 against surfaces or objects, especially when in constricted spaces. In some embodiments, the range finding capability provided by the ultrasonic transducers on the HMD 500 may be used to detect relatively or very close surfaces or objects, and the user may be made aware of the close surfaces or objects or alerted to prevent collisions, for example using audio, visual, and/or haptic feedback An advantage of using sound over light in range finding is that light-based sensors may have difficulty with some surfaces such as glass and mirrors that ultrasonic transducers can easily detect. In addition, light-based sensors may have problems with light interference in some conditions such as bright sunlight. However, in some embodiments, the data collected by the ultrasonic transducers may be used in combination with depth data obtained using other range finding technology (e.g., LIDAR technology sensors) on the HMD 500 to construct, augment, or update a 3D map of the environment.

FIG. 6 illustrates an example view that may be rendered and displayed by a VR/MR system based at least in part on analysis of the data collected by the ultrasonic transducers on the HMD 500 and accessory 510 as illustrated in FIG. 5. The ultrasonic transducers on the HMD 500 and accessory 510 may be used to detect stationary or moving objects (e.g., furniture, people, etc.) and surfaces (e.g., walls, mirrors, glass) in the real world environment as the user is moving about in the environment. Ultrasonic transducers on the HMD 500 and accessory 510 emit signals or pings that bounce off surfaces and objects within the environment, and receive echoes of the signals off of the surfaces and objects. In some embodiments, the ultrasonic transducers on the HMD 500 and accessory 510 emit signals at different rates, frequencies, and/or times so that the transmitters of the signals can be identified at the receivers. Time delays for the echoes can be measured and analyzed to estimate the distances and relative positions of the surfaces and objects. The estimated distances and relative positions can be used to construct, augment, or update a 3D map of the environment. The 3D map may, for example be used in rendering a 3D view 600 for display. In VR systems, the 3D view 600 is a view of a virtual world. In MR systems, the 3D view 600 is an augmented view of reality. In some embodiments, virtual representations or indications of real-world objects or surfaces detected by the ultrasonic transducers may be displayed to the user in the VR or MR view 600 as they move about. In this example, virtual representations of objects 520A and 520B and of surface 530 are rendered and displayed.

An advantage of using sound over light is that light-based sensors may have difficulty with some surfaces such as glass and mirrors that ultrasonic transducers can easily detect. In the environment shown in FIG. 5, for example, surface 530 may be a glass wall. If the HMD 500 includes light-based sensors, the light-based sensors may not detect surface 530. However, the ultrasonic transducers on the HMD 500 and/or accessory 510 may easily detect surface 530, allowing surface 530 to be accurately mapped.

As shown in FIG. 5, the user holds the accessory 510 in their hand or wears it on their arm, and thus the ultrasonic transducers on the accessory 510 may scan portions of the environment that are not within the range of the ultrasonic transducers on the HMD 500, for example to the side or rear of the user. Also, the user may move their arm about while holding the accessory 510 to map portions of the room that are not within the range of the ultrasonic transducers on the HMD 500. Thus, the ultrasonic transducers on the accessory 510 may detect objects and surfaces such as objects 520B and 520C and surface 530 that are not in the range, or not fully in the range, of the ultrasonic transducers on the HMD 500.

In addition to using the data collected by the ultrasonic transducers to generate a 3D map 600 of the environment, the ultrasonic transducers on the HMD 500 and accessory 510 may be used to detect nearby objects (e.g., furniture, people, etc.) and surfaces (e.g., walls, mirrors, glass) in the real world environment to help prevent collisions with the objects and surfaces as the user is moving about in the environment. In some embodiments, in a VR system, the system may perform a hard reset of the user's position or orientation if the user is in danger of a collision with a detected object or surface. In some embodiments, in a VR or MR system, the system may provide audio, visual, and/or haptic feedback or alerts to the user if the system detects a potential collision with an object or surface.

Figure 7:
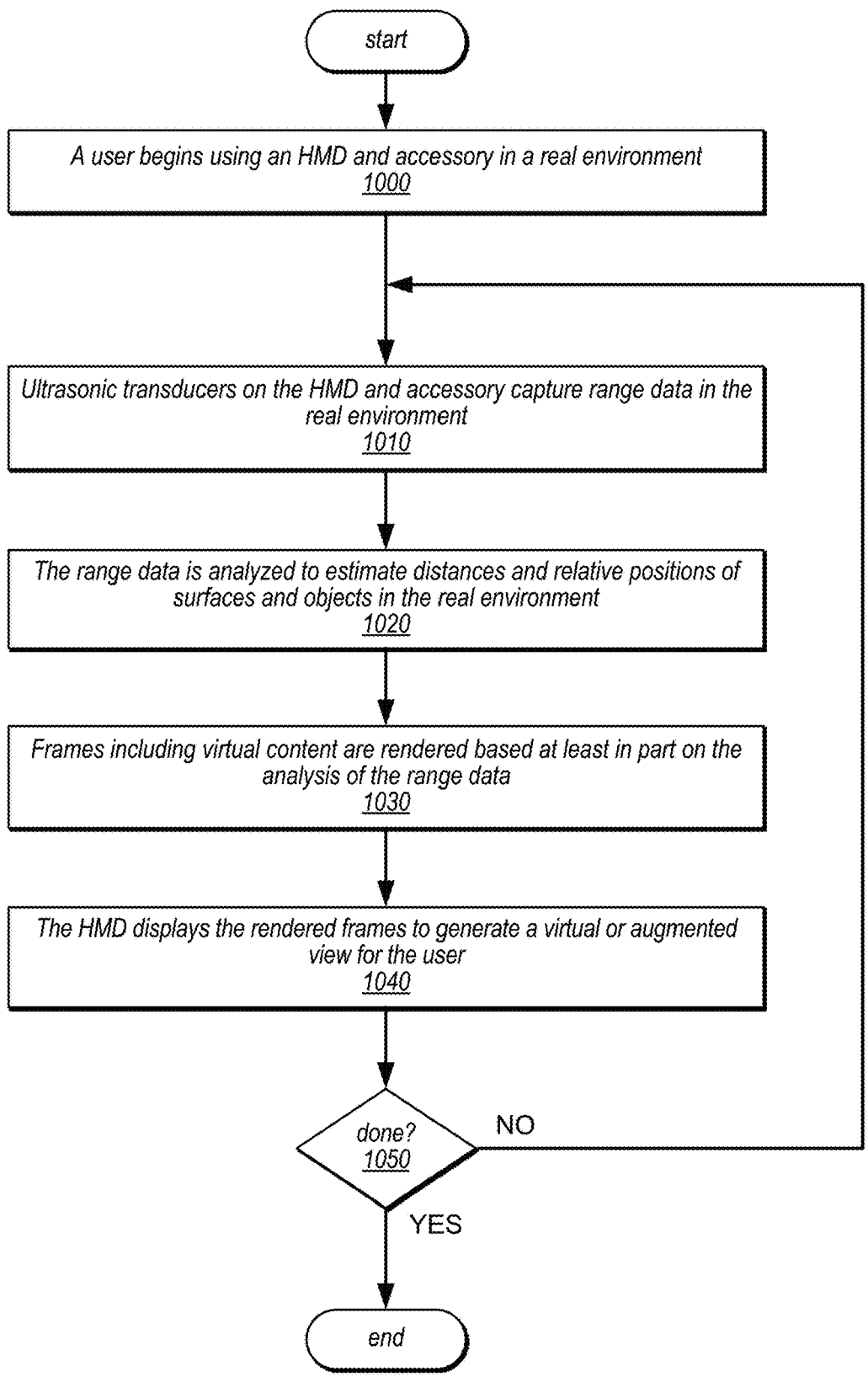
FIG. 7 is a high-level flowchart of a method of operation for range finding in a VR/MR system as illustrated in FIGS. 1 through 3, according to some embodiments.

FIG. 7 is a high-level flowchart of a method of operation for range finding in a VR/MR system as illustrated in FIGS. 1 through 3, according to some embodiments. As indicated at 1000, a user begins using an HMD and accessory in a real environment. For example, the HMD may be a helmet, goggles, or glasses that the user places on their head, and the accessory may be a hand-held device such as a controller or mobile multipurpose device. The user may then begin execution of a VR or MR application to view and participate in a virtual reality view or an augmented view of reality. The VR/MR system allows the user freedom of movement within the real environment, for example within a constrained environment such as a room or gym. Thus, the user may walk about while experiencing the VR or MR world view. However, embodiments may also be used in unconstrained environments.

As indicated at 1010, ultrasonic transducers on the HMD and accessory capture range data in the real environment. The ultrasonic transducers on the HMD and accessory emit signals or pings that bounce off surfaces and objects within the environment, and receive echoes of the signals off of the surfaces and objects. In some embodiments, the ultrasonic transducers on the HMD and accessory emit signals at different rates, frequencies, and/or times so that the transmitters of the signals can be identified at the receivers. Because the accessory is carried in the user's hand or worn on their arm, the ultrasonic transducers on the accessory may scan portions of the environment that are not within the range of the ultrasonic transducers on the HMD.

As indicated at 1020, the range data is analyzed to estimate distances and relative positions of surfaces and objects in the real environment. For example, time delays for the echoes can be measured and analyzed to estimate the distances and relative positions of the surfaces and objects.

As indicated at 1030, frames including virtual content are rendered based at least in part on the analysis of the range data. For example, the estimated distances and relative positions can be used to construct, augment, or update a 3D map of the environment. The 3D map may, for example be used in rendering a 3D view for display. In VR systems, the 3D view is a view of a virtual world. In MR systems, the 3D view is an augmented view of reality. In some embodiments, virtual representations or indications of real-world objects or surfaces detected by the ultrasonic transducers may be displayed to the user in the VR or MR view as they move about.

As indicated at 1040, the HMD displays the rendered frames to generate a virtual or augmented view for the user. As indicated by the arrow returning from element 1050 to element 1010, the VR/MR system may continue to receive and process inputs from the ultrasonic transducers and to render frames for display as long as the user is using the VR/MR system.

Figure 8:
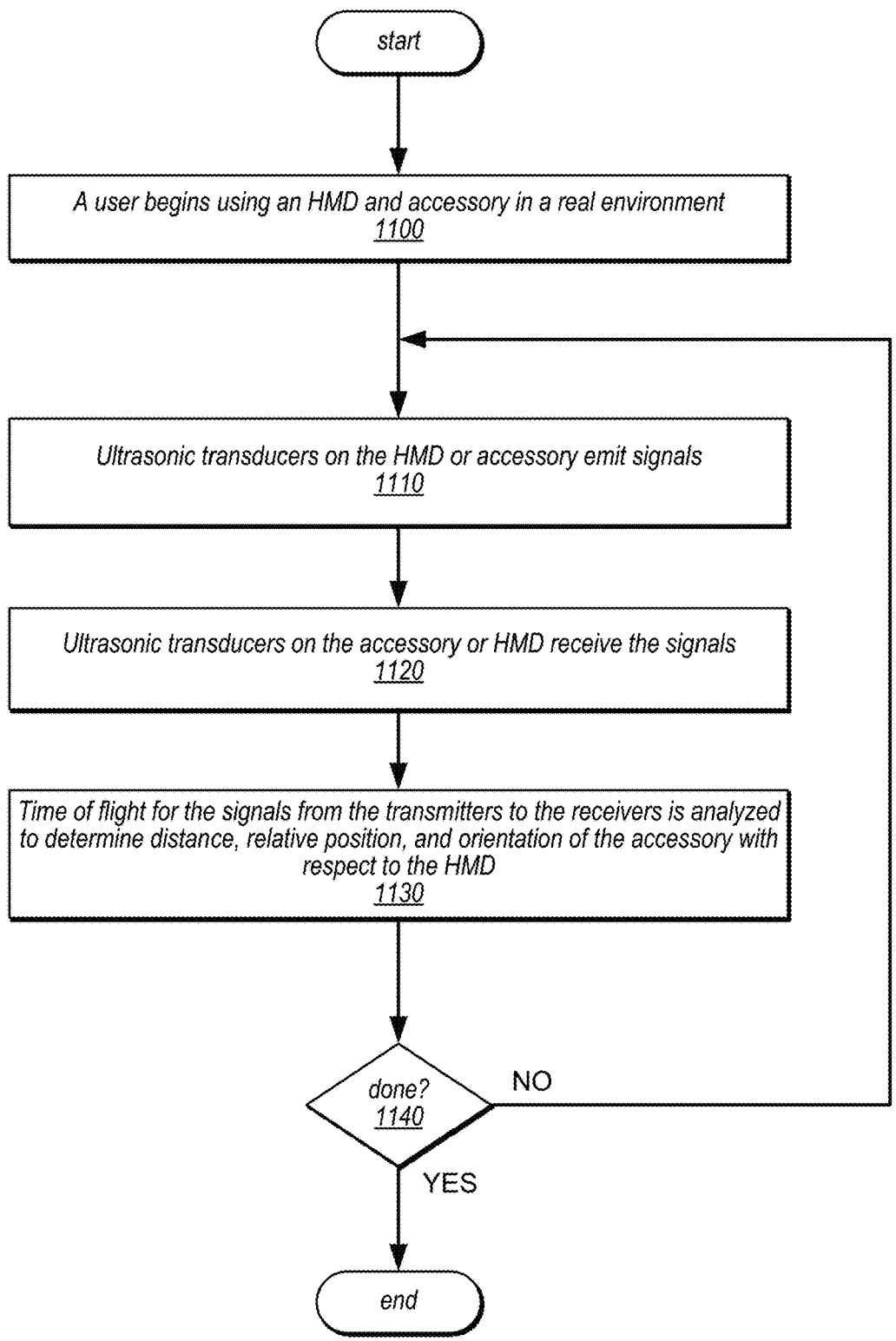
FIG. 8 is a high-level flowchart of a method of operation for using ultrasonic transducers on an HMD and accessory in a VR/MR system as illustrated in FIGS. 1 through 3 to track relative position of the accessory to the HMD, according to some embodiments.

FIG. 8 is a high-level flowchart of a method of operation for using ultrasonic transducers on an HMD and accessory in a VR/MR system as illustrated in FIGS. 1 through 3 to track relative position of the accessory to the HMD, according to some embodiments. As indicated at 1100, a user begins using an HMD and accessory in a real environment. For example, the HMD may be a helmet, goggles, or glasses that the user places on their head, and the accessory may be a hand-held device such as a controller or mobile multipurpose device. The user may then begin execution of a VR or MR application to view and participate in a virtual reality view or an augmented view of reality. The VR/MR system allows the user freedom of movement within the real environment, for example within a constrained environment such as a room or gym. Thus, the user may walk about while experiencing the VR or MR world view. However, note that embodiments may also be used in unconstrained environments.

As indicated at 1110, ultrasonic transducers on the HMD or accessory emit signals. For example, three ultrasonic transmitters or transceivers on the HMD emit signals or pings, or three ultrasonic transmitters or transceivers on the accessory emit signals or pings In some embodiments, the ultrasonic transducers on the HMD and accessory emit signals at different rates, frequencies, and/or times so that the transmitters of the signals can be identified at the receivers.

As indicated at 1120, ultrasonic receivers on the other device (the accessory or the HMD) receive the signals that were emitted at 1110. For example, three ultrasonic receivers or transceivers on the HMD receive the signals or pings, or three ultrasonic receivers or transceivers on the accessory receive the signals or pings.

As indicated at 1130, time of flight for the signals from the transmitters to the receivers is analyzed to determine distance, relative position, and orientation of the accessory with respect to the HMD. In embodiments where the ultrasonic transducers on the HMD send ultrasonic signals that are received by ultrasonic transducers on the accessory, the time of flight for the signals from the transmitters to the receivers may be analyzed on the accessory to determine distance, relative position, and orientation of the accessory with respect to the HMD; the computed information may then be transmitted to the HMD via a wired or wireless connection. Alternatively, the data collected by the ultrasonic transducers on the accessory may be transmitted to the HMD via a wired or wireless connection, and the data may be analyzed on the HMD to determine distance, relative position, and orientation of the accessory with respect to the HMD. In embodiments where the ultrasonic transducers on the accessory send ultrasonic signals that are received by ultrasonic transducers on the HMD, the time of flight for the signals from the transmitters to the receivers may be analyzed on the HMD to determine distance, relative position, and orientation of the accessory with respect to the HMD. In embodiments that include a base station, data collected by the ultrasonic transducers on the accessory or on the HMD may be transmitted to the base station via a wired or wireless connection, and the data may be analyzed on the base station to determine distance, relative position, and orientation of the accessory with respect to the HMD.

As indicated by the arrow returning from element 1140 to element 1110, the VR/MR system may continue to process data from the ultrasonic transducers to track location and orientation of the accessory as long as the user is using the VR/MR system.

Figure 9:
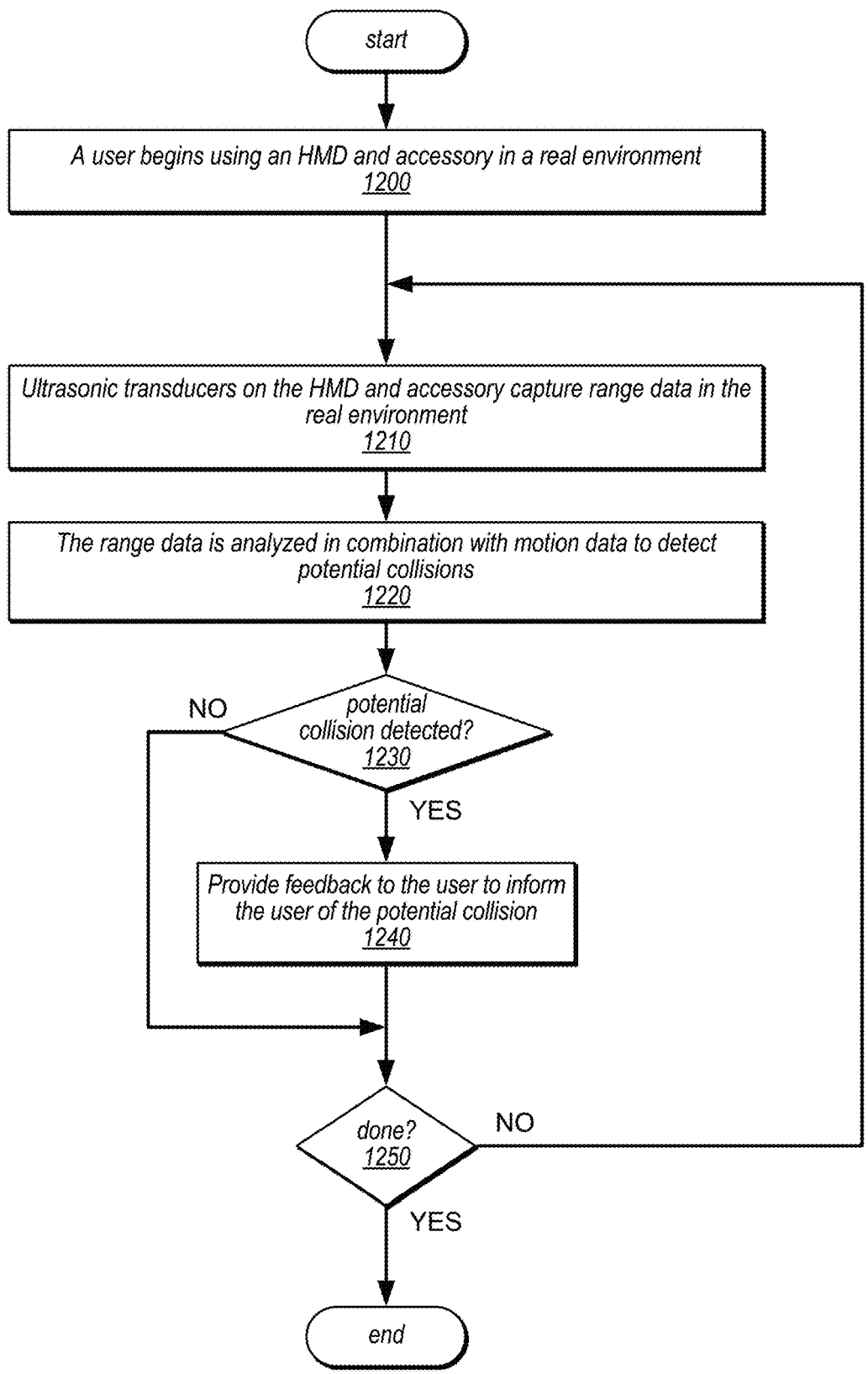
FIG. 9 is a high-level flowchart of a method for detecting potential collisions in a VR/MR system as illustrated in FIGS. 1 through 3, according to some embodiments.

FIG. 9 is a high-level flowchart of a method for detecting potential collisions in a VR/MR system as illustrated in FIGS. 1 through 3, according to some embodiments. As indicated at 1200, a user begins using an HMD and accessory in a real environment. For example, the HMD may be a helmet, goggles, or glasses that the user places on their head, and the accessory may be a hand-held device such as a controller or mobile multipurpose device. The user may then begin execution of a VR or MR application to view and participate in a virtual reality view or an augmented view of reality. The VR/MR system allows the user freedom of movement within the real environment, for example within a constrained environment such as a room or gym. Thus, the user may walk about while experiencing the VR or MR world view. However, embodiments may also be used in unconstrained environments.

As indicated at 1210, ultrasonic transducers on the HMD and accessory capture range data in the real environment. The ultrasonic transducers on the HMD and accessory emit signals or pings that bounce off surfaces and objects within the environment, and receive echoes of the signals off of the surfaces and objects. In some embodiments, the ultrasonic transducers on the HMD and accessory emit signals at different rates, frequencies, and/or times so that the transmitters of the signals can be identified at the receivers. Because the accessory is carried in the user's hand or worn on their arm, the ultrasonic transducers on the accessory may scan portions of the environment that are not within the range of the ultrasonic transducers on the HMD.

As indicated at 1220, the range data is analyzed in combination with motion data to detect potential collisions with surfaces and objects in the real environment. The range data is analyzed to estimate distances and relative positions of surfaces and objects in the real environment. For example, time delays for the echoes can be measured and analyzed to estimate the distances and relative positions of the surfaces and objects. Motion data, for example determined from analysis of the range data over time and/or analysis of acceleration, orientation, and rotation data collected from IMUs in the HMD and/or accessory, is analyzed to determine motion of the HMD and/or accessory with respect to the real environment.

At 1230, if analysis of the range data and motion data indicates that the HMD and/or accessory may collide with a surface or object in the environment, then as indicated at 1240 the VR/MR system may provide feedback to the user to alert the user of the potential collision and/or to inform the user that there is a nearby surface or object that the user should be aware of. Otherwise, the method proceeds to 1250. Audio, visual, and/or haptic feedback may be used to alert or inform the user. For example, if the VR/MR system detects from data collected by the accessory that the user's hand may strike a nearby object or surface, the system may provide haptic feedback through the accessory to alert the user of the potential collision, possibly in combination with audio and/or visual alerts through the HMD. As another example, if the VR/MR system detects from data collected by the HMD that the HMD may strike a nearby object or surface, the system may provide haptic, audio, and/or visual feedback through the HMD to alert the user of the potential collision.

As indicated by the arrow returning from element 1250 to element 1210, the VR/MR system may continue to receive and process inputs from the ultrasonic transducers to detect and alert on potential collisions as long as the user is using the VR/MR system.

In embodiments, a VR/MR system may perform one or more of the methods as illustrated in FIGS. 7 through 9 while the user is using the VR/MR system.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
    a head-mounted display (HMD) comprising:
        a range finding transmitter configured to emit a signal; and
        a range finding receiver configured to:
            receive a reflected version of the signal emitted by the range finding transmitter of the HMD; and
            receive another signal, or a reflected version of the other signal, emitted by another range finding transmitter;
    one or more processors; and
    one or more memories comprising program instructions that are executable by the one or more processors to:
        analyze the received reflected version of the signal emitted by the range finding transmitter of the HMD and the received other signal, or reflected version of the other signal, emitted by the other range finding transmitter to estimate distances and relative positions of surfaces and objects in an environment of the HMD
    wherein the received other signal, or reflected version of the other signal, emitted by the other range finding transmitter provides distance and/or relative position data for portions of the environment that are not represented in the received reflected version of the signal emitted by the range finding transmitter of the HMD.

2. The system as recited in claim 1, wherein the other range finding transmitter is included in an accessory configured to be hand-held or worn by a user of the HMD.

3. The system as recited in claim 2, further comprising:
    the accessory configured to be hand-held or worn by a user of the HMD, wherein the accessory comprises:
        the other range finding transmitter;
        an additional range finding receiver; and
        a wired or wireless interface connecting the accessory to the HMD or a base station for the HMD.
    wherein the program instructions, when executed using the one or more processors, cause the one or more processors to:
        analyze the signal, or a reflected version of the signal, emitted by the range finding transmitter of the HMD, received at the additional range finding receiver of the accessory, or a reflected version of the other signal emitted by the other range finding transmitter of the accessory, received at the additional range finding receiver of the accessory, to estimate the distances and the relative positions of the surfaces and objects in the environment of the HMD.

4. The system as recited in claim 1, wherein, to analyze the range data to estimate distances and relative positions of surfaces and objects in the environment, the program instructions are executable by the one or more processors to measure and analyze time delays for the reflected version of the signal or the reflected version of the other signal received at the range finding receiver of the HMD to estimate the distances and relative positions of the surfaces and objects.

5. The system as recited in claim 1, wherein the program instructions are executable by the one or more processors to generate a map of the environment based at least in part on the estimated distances and relative positions of the surfaces and objects in the environment.

6. The system as recited in claim 3, wherein the accessory is a controller for the HMD or a mobile multipurpose device.

7. The system as recited in claim 1, wherein the one or more processors and the memory are components of the HMD.

8. The system as recited in claim 1, wherein the signal and the other signal are emitted at different rates, frequencies, and/or times such that the reflected versions of the signal and the other signal are disambiguated when analyzed by the one or more processors. red or wireless connection.

9. The system as recited in claim 1, wherein the one or more processors and the memory are components of a base station that communicates with the HMD via one or more wired or wireless connections.

10. The system as recited in claim 9, wherein the base station includes one or more range finding transmitters and receivers, wherein the program instructions are further executable to analyze signals or reflected signals captured by the one or more range finding receivers of the base station to estimate the distances and the relative positions of the surfaces and the objects in the environment.

11. The system as recited in claim 1, wherein the range finding transmitter and range finding receiver of the HMD include an ultrasonic transmitter and an ultrasonic receiver.

12. The system as recited in claim 1, wherein the other range finding transmitter is included in an accessory configured to be hand-held or worn by a user of the HMD, and wherein the other range finding transmitter of the accessory includes an ultrasonic transmitter.

13. A method, comprising:
    performing, by one or more processors:
        obtaining range data from one or more range finding sensors of a head-mounted display (HMD) worn by a user that displays views to the user as the user moves in a real environment, wherein the range data is generated based on received version of signals emitted from a range finding transmitter of the HMD that are received at one or more range finding receivers of the HMD;
        obtaining additional range data from the one or more range finding sensors of the HMD, wherein the additional range data is generated based on received versions of other signals emitted from a range finding transmitter of an accessory held or worn by the user, wherein the other signals are received at the one or more range finding receivers of the HMD, wherein the received versions of the other signals emitted from the range finding transmitter of the accessory provide data for portions of the environment that are not represented in the received version of the signal emitted by the range finding transmitter of the HMD;
        analyzing the range data and the additional range data to estimate distances and relative positions of surfaces and objects in the real environment with respect to the user wearing the HMD.

14. The method as recited in claim 13, wherein the views are virtual reality (VR) or mixed reality (MR) views, the method further comprising:
- rendering, by the one or more processors, frames including virtual content based in part on the estimated distances and relative positions of the surfaces and objects in the environment; and
- displaying, by the HMD, the rendered frames on the HMD.

15. The method as recited in claim 13, further comprising determining, by the one or more processors, distance, relative position, and orientation of the accessory with respect to the HMD based at least in part on a time of flight of a given one of the other signals that is emitted at the accessory and received at the HMD.

16. The method as recited in claim 13, wherein analyzing the range data and the additional range data to estimate distances and relative positions of surfaces and objects in the real environment comprises measuring and analyzing time delays for echoes received at the range finding sensors of the HMD of range finding signals emitted by the range finding sensors of the accessory to estimate the distances and relative positions of the surfaces and objects.

17. The method as recited in claim 13, further comprising generating a map of the environment based at least in part on the estimated distances and relative positions of the surfaces and objects in the environment.

18. The method as recited in claim 13, wherein the one or more processors are components of the HMD, wherein the accessory communicates with the HMD via a wired or wireless connection.

19. The method as recited in claim 13, wherein the one or more processors are components of a base station that communicates with the HMD and the accessory via one or more wired or wireless connections.

20. The method as recited in claim 13, wherein the range finding sensors on the HMD include ultrasonic transducers.

21. The method as recited in claim 13, wherein the range finding sensors on the accessory include ultrasonic transducers.

* * * * *